June 28, 1960  W. M. POPE  2,942,361
DITCHING ATTACHMENT FOR TRACTORS OR THE LIKE
Filed June 21, 1955  2 Sheets-Sheet 1

INVENTOR:
WALTER M. POPE

BY Eaton + Bell

ATTORNEYS

June 28, 1960  W. M. POPE  2,942,361
DITCHING ATTACHMENT FOR TRACTORS OR THE LIKE
Filed June 21, 1955  2 Sheets-Sheet 2
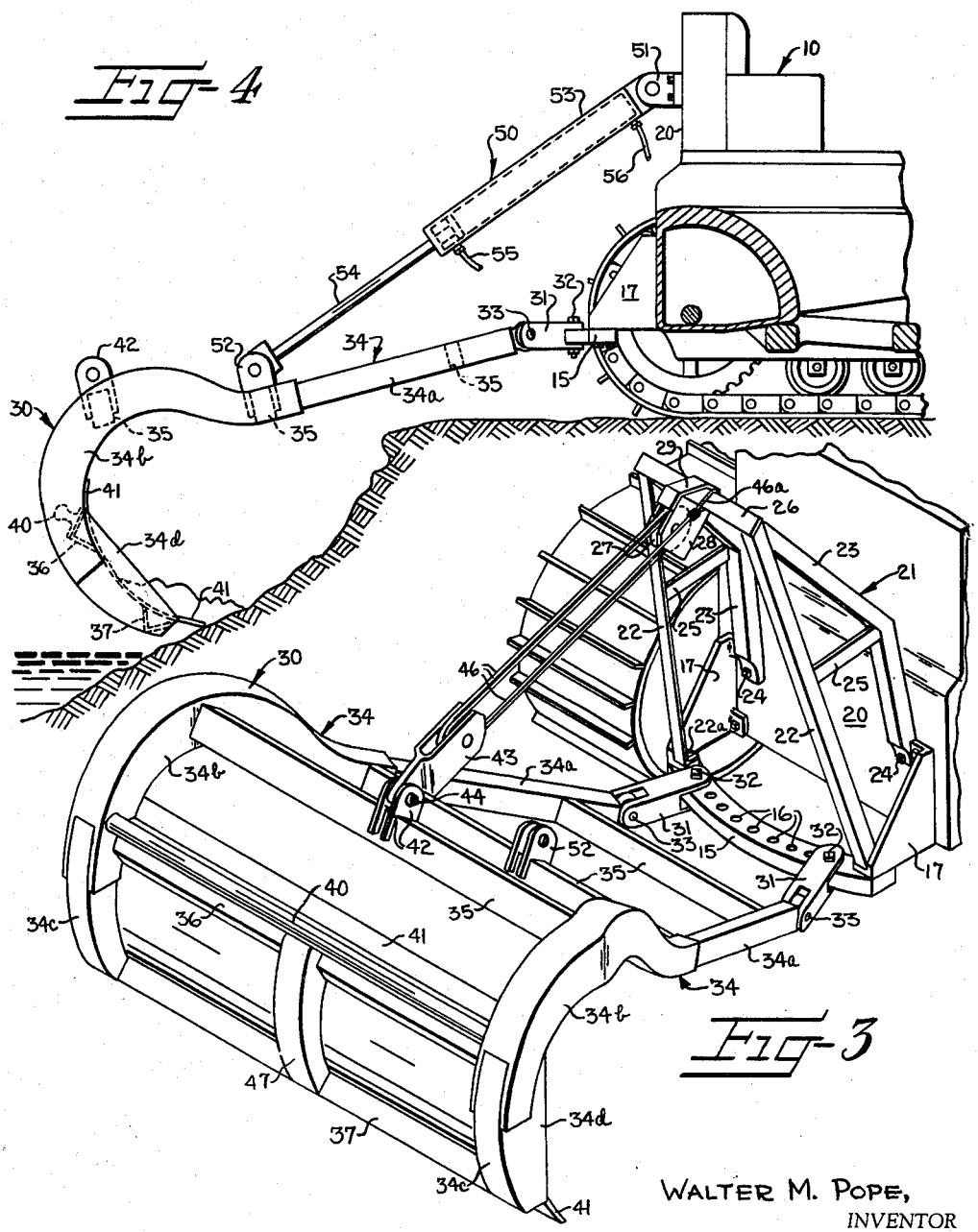
WALTER M. POPE,
INVENTOR
BY  Eaton + Bell
ATTORNEYS

United States Patent Office 2,942,361
Patented June 28, 1960

2,942,361

DITCHING ATTACHMENT FOR TRACTORS OR THE LIKE

Walter M. Pope, Rte. 5, Box 364, Asheboro, N.C.

Filed June 21, 1955, Ser. No. 516,971

5 Claims. (Cl. 37—98)

This invention relates to improvements in a ditching attachment for powered vehicles and more especially to a ditching attachment for bulldozers or tractors.

Heretofore, earth clearing type tractors have been equipped with a strong and sturdy brace disposed on each side of the tractor and these braces extend forwardly on the outside of the wheels or endless tracks and have a strong blade attached to their front ends so the tractor can be used for pushing earth and, to a limited degree, for dragging and pulling small amounts of earth. This arrangement comprising the side braces and the front blade, is commonly known as a bulldozer arrangement, and is usually raised and lowered to desired positions by manually controlled hydraulic means or other powered means.

The present invention allows a tractor of the character set forth to also be used for cleaning out ditches and dragging away banks by the addition thereto of a rear blade so mounted that it will not in any way disturb the bulldozer attachment on the front end. At such times as the ditch cleaning apparatus or bank dragging apparatus attached to the rear end of a tractor is used, it is, of course, evident that the bulldozer attachment ordinarily would not be used, but the heavy blade and side pieces would give added weight to the front end of the tractor which would increase its traction and allow the ditch cleaning operation to be much more efficiently performed than would be the case if the ditch cleaning out and bank dragging apparatus were installed on the rear end of a regular tractor which is not equipped with a bulldozer attachment.

It is therefore a primary object of this invention to provide a rear blade ditching attachment for tractors which may be secured to the rear end of the tractor without detaching the usual front blade secured thereto so both blades may be used seprately or in conjunction with each other.

Another object of this invention is to provide means on the rear end of the tractor by which the rear blade ditching attachment may be elevated and lowered while in normal use without interfering with the operation of or modifying the attachment of the front blade on the tractor.

A further object of this invention is to pivotally secure a hook-shaped or sickle-shaped rear blade ditching attachment to the conventional drawbar of a tractor which drawbar is spaced only a short distance above the surface of the ground on which the tractor rests to permit the rear blade ditching attachment to be lowered a substantial distance below the surface of the ground on which the tractor rests to readily remove muck or dirt from the bottom of a ditch and to clear the sides of the ditch when the tractor is backed up to the ditch into operating position and thereafter given forward movement.

Some of the objects of the invention having been stated, other objects will appear as the description proceeds, when taken in connection with the accompanying drawings, in which—

Figure 3 is a perspective view of Figure 2 and showing a block and tackle arrangement and supporting structure for elevating and lowering the rear blade ditching attachment;

Figure 4 is a side elevation of a modified form of the invention wherein a hydraulic lift is employed for elevating and lowering the rear blade ditching attachment and wherein the rear blade ditching attachment is shown in normal operating position for clearing a drainage ditch.

Figure 1:
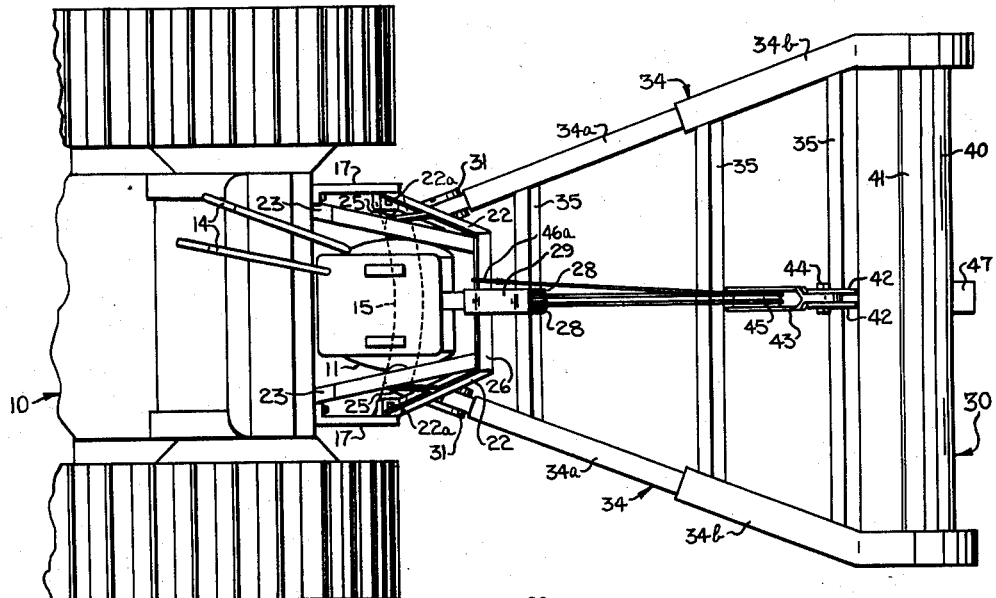
Figure 1 is a top plan view of the preferred form of the invention showing the rear blade ditching attachment secured to the rear end of a tractor or bulldozer.
Figure 2:
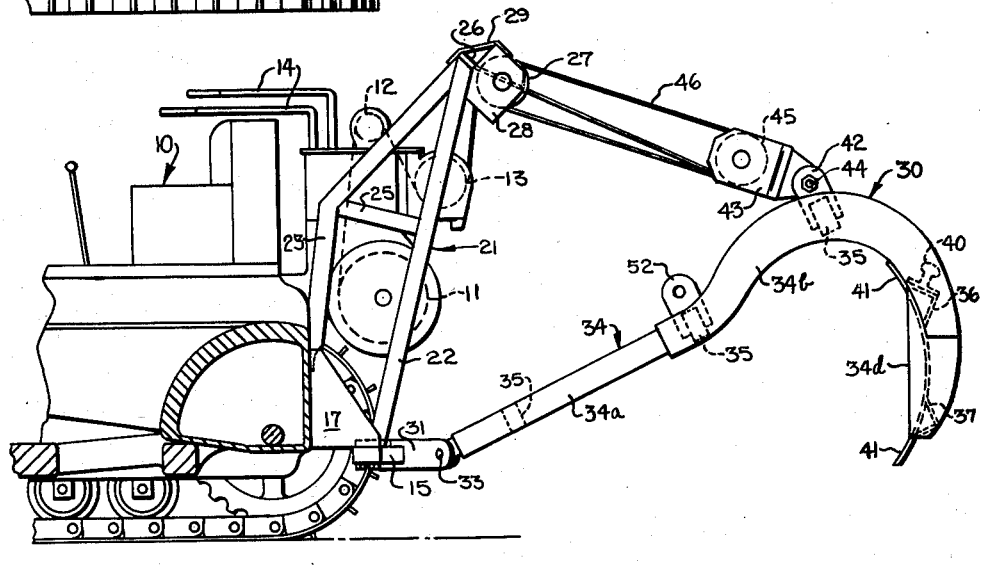
Figure 2 is a side elevation of Figure 1 and showing the rear blade ditching attachment in elevated or nonoperating position.

Referring more specifically to the drawings wherein identical parts bear the same reference numeral, there is shown, in Figures 1 to 3 of the preferred form of the invention, a rear end portion of a tractor or bulldozer 10 provided with a conventional winch 11, cable guide pulleys 12 and 13 and levers 14 for controlling operation of the winch. The tractor 10 is provided with a conventional drawbar 15 having a plurality of attachment holes 16. The drawbar is secured to the tractor, between the rear portions of the endless side tracks of the tractor, by a pair of spaced and vertically positioned angle plates 17 suitably secured to the back wall 20 of the tractor.

A framework broadly designed at 21, and being of A-frame construction, is provided to enable a rear blade ditching attachment broadly indicated at 30 to be elevated into nonoperating position by the winch 11. The framework 21 comprises a pair of spaced upright converging back legs 22 and a pair of spaced converging front legs 23 bent at a medial portion to join the back legs 22 at the top ends thereof where the same are suitably secured together, as by welding. A pair of side cross members 25 connect a medial portion of the leg members 22, 23 to brace the same. The lower ends of the back legs 22 are secured to the drawbar 15 by any suitable means such as bolts 22a, while the front legs 23 have their lower ends secured to the back wall 20 of the tractor, as by bolts 24. A cross member 26 connects the two sides of the A-frame structure together at their top edges.

A pair of pulleys 27 are rotatably supported between a pair of spaced plates 28, which plates are secured to the cross member 26 at the top of the frame structure 21. A substantially U-shaped member 29 is provided for maintaining the pair of plates 28 in proper spaced position relative to each other and to securely connect the plates 28 to the cross member 26.

The rear blade ditching attachment 30 is secured to the drawbar 15 of the tractor 10 by a pair of spaced links 31 and bolts 32. The pair of spaced links 31 are pivotally secured at 33 to a pair of sickle-shaped or hook-shaped spaced side members or booms 34 each of which comprises front tube members 34a suitably secured to substantially C-shaped intermediate side members 34b whose bifurcated lower ends support rearmost side member portions 34c having smooth curved rear surfaces. The booms 34 diverge rearwardly because of the length of the transverse drawbar 15 as compared to the overall width of the tractor. It will be noted that the side member portions 34c have side plate members 34d formed integral therewith having exposed edges which act as side blades for cutting in the earth being removed and which members 34d prevent some of the earth from spilling over the side edges of the rear blade ditching attachment 30.

A plurality of cross members 35 are provided for joining the spaced sides 34 of the rear blade ditching attachment 30 securely together. An angle bar 36 and an angle bar 37 are provided for securely joining together opposed surfaces of the side member portions 34b and 34c. A weight member 40 formed, for example, from a railroad track rail, is secured to the angle bar 36 to provide sufficient weight for a curved blade 41 of the rear blade ditching attachment 30 to penetrate the surface of the earth for scooping dirt. As will be observed in Figure 2, the blade 41 is secured to the inner surface edges of the angle members 36 and 37 and extends a short distance downwardly beyond the side member portions 34c and upwardly a short distance beyond the angle bar 36. The blade 41 is also secured to the proximal surfaces of the side plates 34b. In other words, the side members 34 diverge rearwardly from between the tracks of the bulldozer or tractor so the length of the blade 41 is substantially greater than the distance between said tracks, and is attached to the downwardly-curved rear ends of the booms 34, without projecting beyond the distal surfaces of the booms 34.

A lug 42 is provided on the outermost positioned cross member 35 and a pulley block 43 is pivotally mounted at 44 on lug 42 and carries a pair of pulleys 45 around which a lifting and lowering cable 46 is guided. An end 46a of the cable 46 is fixedly secured around the cross member 26 of the A-frame structure 21 adjacent an outer surface of one of the plates 28 which support the pair of pulleys 27. The cable 46 is placed in operating position by being threaded outwardly from member 26 under and around one of the pair of pulleys 45 and then back over and around one of the pairs of pulleys 27 and back under and around the other pulley 45 and back over the other pulley 27 and down under pulley 13 and up over the pulley 12 and down around the winch 11. It is thus seen that when the winch 11 is operated by one of the levers 14 the rear blade ditching attachment 30 may be elevated or lowered by the cable 46 being wound on or unwound from the winch 11.

A rib member 47 having a curved outer surface in alinement with the curved outer surface of the side portions 34c is provided for bracing the angle members 36 and 37 and to provide a smooth curved surface for the rear blade ditching attachment 30 to move along the surface of the earth below the earth being scooped by the blade 41.

In Figure 4, a modified form of the invention is shown wherein the identical rear blade ditching attachment 30 as illustrated in the preferred form of the invention in Figures 1 to 3 is employed, but hydraulic means, rather than cable lifting means, are employed for elevating and lowering the ditching attachment 30. As will be observed in Figure 4, a hydraulic lifting means broadly indicated at 50 has one end secured to a lug 51 provided on the back wall 20 of the tractor 10 and the other end secured to a lug 52 provided on one of the cross members 35 of the attachment 30. A cylinder housing 53 slidably receives a piston 54 which is retracted by a fluid entering line 55 and extended by a fluid entering line 56 from a suitable fluid supply and pump, not shown, which are conventional on some forms of tractors.

This modified form of the invention shown in Figure 4 is particularly adaptable for those tractors or bulldozers which employ hydraulic means for elevating and lowering their front blade attachment rather than the form of tractor or bulldozer which employs cable means for raising and lowering the front blade attachment.

It is thus seen that there has been provided a rear blade ditching attachment for tractors which can be readily attached to the drawbar of the tractor for pulling the same in normal use and easily operable means are disclosed attached to the back plate of the tractor for elevating and lowering the rear blade ditching attachment. It will also be observed that the manner in which the rear blade ditching attachment is secured to the tractor permits the use of a front blade on the tractor without its operation being interfered with by the rear blade ditching attachment so both blades may be used separately or simultaneously in conjunction with each other. It is to be particularly noted that the rear blade ditching attachment scoops earth by a forward movement of the tractor the same as the conventional front blade on a bulldozer. Also, the positioning of the ditching attachment on the rear end of the tractor permits the operator of the tractor who is seated on the rear end to more readily observe and position the tractor adjacent the brink of the ditch wtihout endangering or overturning the tractor and to therefore more readily obtain the maximum operating stroke of the rear blade ditching attachment when the same is lowered into a ditch as shown in Figure 4.

In the drawings and specification there have been set forth two embodiments of the invention and, although specific terms are employed, they are used in a generic and descriptive sense only, and not for purposes of limitation, the scope of the invention being defined in the claims.

I claim:

1. An earth moving attachment for the rear end of a tractor of the type having a transverse drawbar projecting from its rear lower portion and a cable letting-off and taking-up means above said drawbar, said attachment comprising a pair of rearwardly diverging booms, means to pivotally connect said booms to the drawbar, a rearwardly and downwardly curved member on the rear end of each boom, a curved blade having its opposite ends fixed to the proximal surfaces of said curved members, said curved blade spanning the distance between said curved members, an upwardly extending framework fixed to the rear end of the tractor, at least one cross member having its opposite ends fixed to the upper portions of said curved members, a pulley block mounted on a medial portion of said cross member, a first pair of pulleys journaled on said framework substantially above the level of the drawbar, a second pair of pulleys journaled on said pulley block, and said cable extending from its letting-off and taking-up means, being entrained over the first and second pairs of pulleys and having its end remote from the letting-off and taking-up means fixed to said framework adjacent the first pair of pulleys.

2. An earth moving attachment for the rear end of a tractor of the type having a transverse draw bar projecting from its rear lower portion and a means above the draw bar for letting-off and taking-up a cable, said attachment comprising a pair of spaced, rearwardly diverging booms, a rearwardly and downwardly curved member on the rear end of each boom, each of said booms and its corresponding rearwardly and downwardly curved member defining a sickle-shaped side member, means pivotally connecting the forward ends of said side members to the draw bar, at least one angle bar fixed to and spanning the distance between the rearwardly and downwardly curved members of said side members, a curved blade secured to said angle bar and to the proximal surfaces of said curved members, said curved blade extending downwardly beyond the lower rear ends of said curved members and being of a length substantially equal to the distance between distal surfaces of said curved members, said curved members projecting forwardly with respect to the opposite sides of said curved blade for preventing the earth being moved from spilling over the sides of said blade and serving as side cutting blades when the attachment is scooping earth, an upwardly extending framework fixed to the rear end of the tractor, at least one cross member having its opposite ends fixed to the upper portions of said curved members, a pulley block mounted on a medial portion of said cross member, a first pair of pulleys journaled on said framework substantially above the level of the draw bar, a second pair of pulleys journaled on said pulley block, a cable extending from the letting-off and taking-up means, said cable being entrained over the first and second pairs of pulleys and having its end remote from the letting-off and taking-up means fixed to said framework adjacent the first pair of pulleys for permitting the letting-off and taking-up means to raise and lower said attachment through said cable.

3. An earth moving attachment for the rear end of a tractor of the type having a transverse draw bar projecting from its rear lower portion, said attachment comprising a pair of spaced, rearwardly diverging booms, a rearwardly and downwardly curved member on the rear end of each boom, each of said curved members having a bifurcated lower rear end, a side plate received within the bifurcated lower rear end of each curved member and protruding downwardly therefrom, said side plates having curved rear end surfaces merging with the rearward downward curves of their corresponding curved members, each of said booms and its corresponding curved member and side plate defining a sickle-shaped side member having a smoothly curved rear end surface, means pivotally connecting the forward ends of said side members to the draw bar, a first angle bar fixed to and spanning the distance between said curved members adjacent the bifurcated lower rear ends thereof, a second angle bar fixed to and spanning the distance between said side plates in spaced parallel relation to said first angle bar, a curved blade secured to said first and second angle bars and having its opposite ends fixed to the proximal surfaces of said curved members and said side plates, said curved blade extending downwardly below said side plates, said side plates extending forwardly with respect to the opposite ends of said curved blade to prevent the earth being moved from spilling over the ends of said blade and providing side cutting blades when the attachment is scooping earth, and means for raising and lowering said sickle-shaped side members.

4. An earth moving attachment as defined in claim 3, wherein said means for raising and lowering said sickle-shaped side members comprises an upwardly extending framework adapted to be fixed to the rear end of the tractor, at least one cross member having its opposite ends fixed to the upper portions of said curved members, a pulley block mounted on a medial portion of said cross member, a first pair of pulleys journaled on said framework substantially above the level of the draw bar, a second pair of pulleys journaled on said pulley block, a cable entrained over the first and second pairs of pulleys, said cable having one end fixed to said framework adjacent the first pair of pulleys, and operable means above the draw bar receiving the other end of said cable for taking-up and letting-off said cable to raise and lower said sickle-shaped side members through said cable.

5. An earth moving attachment as defined in claim 3, wherein said means for raising and lowering said sickle-shaped side members comprises at least one cross member having its opposite ends fixed to the upper portions of said curved members, a cylinder, a piston slidably mounted in said cylinder and extending from one end thereof, one of said cylinder and said piston being connected to said cross member and the other being disposed for attachment to the tractor, and means providing communication between said cylinder and a source of fluid pressure for moving said piston relative to said cylinder in response to pressure variations within said cylinder for raising and lowering said sickle-shaped side members.

References Cited in the file of this patent

UNITED STATES PATENTS

| 1,051,811 | Jikihara | Jan. 28, 1913 |
| 1,923,412 | Bacon | Aug. 22, 1933 |
| 1,964,359 | LeTourneau | June 26, 1934 |
| 2,370,830 | Arps | Mar. 6, 1945 |
| 2,636,289 | Pryor | Apr. 28, 1953 |
| 2,663,099 | Klages | Dec. 22, 1953 |
| 2,677,203 | Poirier | May 4, 1954 |

FOREIGN PATENTS

| 123,138 | Australia | Dec. 16, 1946 |
| 428,500 | Italy | Dec. 19, 1947 |
| 483,528 | Canada | May 27, 1952 |